(12) United States Patent
Puri

(10) Patent No.: US 9,292,661 B2
(45) Date of Patent: Mar. 22, 2016

(54) SYSTEM AND METHOD FOR DISTRIBUTING RIGHTS-PROTECTED CONTENT

(75) Inventor: Atul K. Puri, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1719 days.

(21) Appl. No.: 11/961,121

(22) Filed: Dec. 20, 2007

(65) Prior Publication Data

US 2014/0304762 A1 Oct. 9, 2014

(51) Int. Cl.
| | | |
|---|---|---|
| G06F 7/04 | (2006.01) | |
| G06F 17/30 | (2006.01) | |
| G06F 17/00 | (2006.01) | |
| G06F 21/10 | (2013.01) | |
| G11B 20/00 | (2006.01) | |
| H04L 29/06 | (2006.01) | |
| H04N 21/4627 | (2011.01) | |

(52) U.S. Cl.
CPC .......... *G06F 21/10* (2013.01); *G11B 20/00731* (2013.01); *H04L 63/102* (2013.01); *H04N 21/4627* (2013.01)

(58) Field of Classification Search
CPC .............. G06F 21/6218; H04L 63/102; H04N 21/4627; G11B 20/00731
USPC ................ 705/26; 709/223, 225, 219; 726/27
See application file for complete search history.

(56) References Cited

U.S. PATENT DOCUMENTS

| | | | | |
|---|---|---|---|---|
| 6,092,201 | A * | 7/2000 | Turnbull et al. | 726/4 |
| 6,412,070 | B1 | 6/2002 | Van Dyke | |
| 6,611,814 | B1 * | 8/2003 | Lee et al. | 705/7.29 |
| 6,731,410 | B2 * | 5/2004 | Saito et al. | 358/468 |
| 6,735,701 | B1 | 5/2004 | Jacobson | |
| 6,839,741 | B1 | 1/2005 | Tsai | |
| 6,983,371 | B1 * | 1/2006 | Hurtado et al. | 713/189 |
| 7,099,479 | B1 * | 8/2006 | Ishibashi et al. | 380/281 |
| 7,181,629 | B1 * | 2/2007 | Hatanaka et al. | 713/194 |
| 7,213,269 | B2 * | 5/2007 | Orthlieb et al. | 726/33 |
| 7,231,668 | B2 | 6/2007 | Jacobson | |
| 7,346,683 | B2 * | 3/2008 | Inoue | 709/225 |
| 7,526,494 | B2 * | 4/2009 | Rom et al. | |
| 7,546,640 | B2 * | 6/2009 | Chang et al. | 726/28 |
| 7,685,416 | B2 * | 3/2010 | Newcombe et al. | 713/155 |
| 7,711,843 | B2 * | 5/2010 | Breiter et al. | 709/237 |
| 7,761,905 | B2 * | 7/2010 | Kern | 726/2 |
| 7,904,557 | B1 * | 3/2011 | Van Riel et al. | 709/225 |

(Continued)

*Primary Examiner* — Arvin Eskandarnia
*Assistant Examiner* — Margishi Desai
(74) *Attorney, Agent, or Firm* — Kilpatrick Townsend & Stockton LLP

(57) ABSTRACT

Various embodiments of a method and system for a content distribution mechanism. A content distribution mechanism is implemented to receive rights-protected content. Access to the rights-protected content is controlled according to a policy via a policy server. The distribution mechanism may receive an attempt to forward the rights-protected content to one or more recipients that do not currently have access to the rights-protected content. The distribution mechanism may hold the document and send a message requesting access rights to the rights-protected content for the recipient(s). In some embodiments, the distribution mechanism may send the message to a policy server. In other embodiments, the distribution mechanism may send the message to a policy administrator. Upon receiving acknowledgement that the recipient(s) have been granted access rights to the content, the distribution mechanism may forward the rights-protected content to the recipient(s).

28 Claims, 6 Drawing Sheets

(56) References Cited

U.S. PATENT DOCUMENTS

| | | |
|---|---|---|
| 7,958,080 B2* | 6/2011 | Kumar et al. ............... 706/62 |
| 8,010,984 B2* | 8/2011 | Thukral ..................... 725/86 |
| 2003/0131041 A1* | 7/2003 | Dinker et al. .............. 709/104 |
| 2003/0143990 A1* | 7/2003 | Minear et al. ............. 455/418 |
| 2004/0107224 A1 | 6/2004 | Bera |
| 2004/0148503 A1* | 7/2004 | Sidman ...................... 713/167 |
| 2004/0260775 A1* | 12/2004 | Fedele ....................... 709/206 |
| 2004/0267889 A1 | 12/2004 | Graham |
| 2004/0268137 A1* | 12/2004 | Kouznetsov et al. ...... 713/193 |
| 2005/0021635 A1* | 1/2005 | Graham et al. ............ 709/206 |
| 2005/0027804 A1 | 2/2005 | Cahill |
| 2005/0038750 A1 | 2/2005 | Cahill |
| 2005/0097321 A1 | 5/2005 | Zhu |
| 2005/0251675 A1 | 11/2005 | Marcjan |
| 2006/0015581 A1* | 1/2006 | Breiter ............. G06F 17/30893 709/219 |
| 2006/0031923 A1* | 2/2006 | Kanai ........................... 726/1 |
| 2006/0080740 A1* | 4/2006 | Bremer et al. ............... 726/26 |
| 2006/0095443 A1* | 5/2006 | Kumar et al. .............. 707/100 |
| 2006/0095792 A1* | 5/2006 | Hurtado et al. ............ 713/189 |
| 2006/0168451 A1* | 7/2006 | Ishibashi et al. ........... 713/176 |
| 2006/0253400 A1* | 11/2006 | Okamoto et al. ............ 705/57 |
| 2007/0156694 A1* | 7/2007 | Lim .................... G06F 21/6218 |
| 2007/0226293 A1* | 9/2007 | Sakurada et al. .......... 709/203 |
| 2007/0239998 A1* | 10/2007 | Beck ........................... 713/193 |
| 2007/0240203 A1* | 10/2007 | Beck ............................... 726/4 |
| 2008/0060084 A1* | 3/2008 | Gappa et al. ................. 726/28 |
| 2008/0071804 A1* | 3/2008 | Gunda et al. .............. 707/100 |
| 2008/0104240 A1* | 5/2008 | Daniels ............... H04L 63/105 709/225 |
| 2008/0155078 A1* | 6/2008 | Parkkinen et al. ......... 709/223 |
| 2008/0208668 A1* | 8/2008 | Heller et al. ................... 705/8 |
| 2008/0301470 A1* | 12/2008 | Green et al. ................ 713/193 |
| 2009/0100346 A1* | 4/2009 | O'Sullivan et al. ........ 715/743 |
| 2009/0249439 A1* | 10/2009 | Olden et al. .................. 726/1 |
| 2009/0328156 A1* | 12/2009 | Malaviarachchi et al. ..... 726/4 |
| 2011/0083196 A1* | 4/2011 | Graham et al. .............. 726/27 |
| 2013/0167198 A1* | 6/2013 | MacLennan et al. .......... 726/4 |

\* cited by examiner

SYSTEM AND METHOD FOR DISTRIBUTING RIGHTS-PROTECTED CONTENT

BACKGROUND

Today's modern networked computing environments make electronic file and content distribution easy and efficient. The term, "content", as used herein, may refer to any digital file content that can be accessed by a computer system. Examples of content include, but are not limited to, word processing files, spreadsheet files, image files, presentation files, PDF files, CAD files and digital media files, such as music, sound and video files.

Application programs configured to send, upload and download electronic file content over a network are ubiquitous. With today's high-speed networks, large amounts of content can quickly be distributed over long distances to many recipients. Most content distributed over the Internet, across corporate networks and between homes is not considered sensitive and therefore presents no security risk. However, ease-of-use and efficiency can quickly be impacted when dealing with sensitive content. Sensitive content may be content in which access is restricted to a limited number of users.

In some cases, a policy may be associated with sensitive content. A policy may define a list of users authorized to access the content. The policy may also define permissions or usage rights associated with each user. For example, one user may have permission to only read the content (e.g., word processing document) and another user may have permission to read or change the content. "Rights-protected content", as used herein, may be sensitive content associated with a policy.

As a further protection from unauthorized access, rights-protected content may be encrypted using complex encryption algorithms. Encryption is the process of transforming information to make it illegible to anyone except those possessing special knowledge, usually referred to as a key. Decryption transforms the encrypted information making it legible again. Whenever two or more people send and receive encrypted sensitive content between each other, credentials may also be managed and exchanged to allow access to the content. User credentials may include digital signatures and/or public/private keys.

The complexity level of content distribution rises when a company or an organization with many employees attempts to integrate the control of rights-protected content within enterprise business processes. Many companies utilize one or more policy servers for administering policies associated with rights-protected content.

Generally speaking, utilizing a content distribution system that protects sensitive content while remaining easy to use can be very complex.

SUMMARY

Various embodiments of a method and system for distributing rights-protected content are disclosed. A content distribution mechanism may receive rights-protected content and may also receive a request to distribute the rights-protected content to one or more recipients. In various embodiments, the content distribution mechanism may be implemented as an e-mail application, a component of an e-mail application, an e-mail server, a stand-alone content distribution application or a component of another application used to distribute content. Rights-protected content may be content associated with an access policy. In some embodiments, an access policy may define a list of users authorized to access the rights-protected content. Access permissions may be associated with each authorized user. Examples of access permissions include "read-only" and "read-write". Some users may be authorized to read the rights-protected content, but not have authorization to change the rights-protected content and other users may be authorized to read or change the rights-protected content.

In some embodiments, a user of a content distribution mechanism may receive a request to forward rights-protected content to a recipient who does not currently have access rights to the rights-protected content. In response to the request to forward the rights-protected content, the distribution mechanism may hold the rights-protected content and request access rights to the rights-protected content for the recipient. In one embodiment, the rights-protected content may be held within an e-mail client and the e-mail client may send a message requesting access rights. In another embodiment, the rights-protected content may be held on an e-mail server and the e-mail server may send a message requesting access rights for the recipient.

In some embodiments the request for access rights may be sent to a policy server. In other embodiments the request for access rights may be sent to a document publisher, policy owner, policy administrator, or another user authorized to grant recipients access to the rights-protected content via the policy server.

The distribution mechanism may receive acknowledgement that the recipient has been granted access rights to the rights-protected content. In response, the distribution mechanism may remove the hold from the rights-protected content (e.g., only for the approved recipient) and forward the rights-protected content to the approved recipient.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Figure 1:
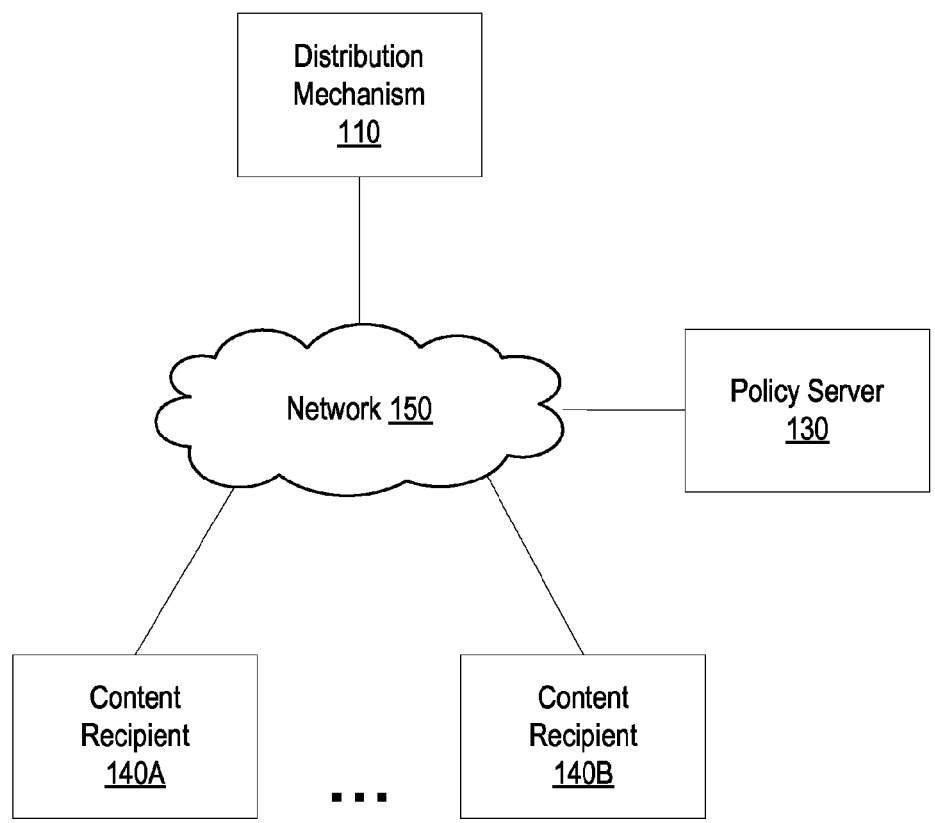
FIG. 1 is a block diagram illustrating a system and method for distributing rights-protected content, according to an embodiment.

FIG. 1 is a block diagram illustrating a system and method for distributing rights-protected content, according to an embodiment. It should be noted that in various embodiments of the methods described below, one or more of the elements described may be performed concurrently, in a different order than shown, or may be omitted entirely. Other additional elements may also be performed as desired.

In some embodiments, a distribution mechanism 110 may accept or receive a request to distribute rights-protected content to a plurality of recipients 140. The rights-protected content may be associated with a policy. The policy may contain a list of one or more users authorized to access the rights-protected content along with permission information; the permission information may define the actions each of the authorized users included in the policy are authorized to perform on the rights-protected content.

In some embodiments, the policy associated with the rights-protected content may be located on a policy server 130 and the distribution mechanism 110 may be configured to communicate with the policy server 130 and request policy information associated with the rights-protected content. In various embodiments, the distribution mechanism 110 may be configured to retrieve the address of the policy server from the content itself, from a network location, or from configuration information. Other methods of obtaining the policy server address may also be employed.

Once the policy information is obtained, distribution mechanism 110 may determine if each of the intended recipients 140 are included in the policy as authorized users associated with the rights-protected content. For the intended recipients 140 already included in the policy, the distribution mechanism 110 may send the rights-protected content to the recipients 140. For each of the recipients 140 not included in the policy (e.g., as authorized users) the distribution mechanism 110 may hold the rights-protected content and send a message to policy server 130 requesting each of the recipients 140 not included in the policy, be added to the policy associated with the rights-protected content.

In some embodiments, instead of sending the request to policy server 130, the distribution mechanism 110 may send the request to a policy administrator or other user having authority to grant access rights via the policy server 130 to the recipients. Access right may be a single right or may include multiple rights. For example, access rights may include the ability to open and view a document, or print a document, etc.

In some embodiments, the distribution mechanism 110 may hold the rights-protected content until it receives acknowledgement that the intended recipients 140 are included in the policy associated with the rights-protected content. When acknowledgement is received, the distribution mechanism 110 may remove the hold from the rights-protected content and send the content to the recipients 140. If distribution mechanism 110 receives a message from the policy server 130 denying the request, distribution mechanism 110 may not send the rights-protected content to the recipients 140.

In some embodiments, distribution mechanism 110 may associate a timeout value with the rights-protected content while the distribution mechanism 110 is waiting for a response. The timeout value may be associated with a threshold. If the timeout value expires before an acknowledgement is received, distribution mechanism 110 may remove the hold from the rights-protected content and the rights-protected content will not be sent to the recipients 140.

Policy server 130 may manage policies associated with rights-protected content. In various embodiments, a policy server 130 enforces rights management policies at the content level. Policy server 130 may control which recipients 140 have access to rights-protected content and define what they can do with the rights-protected content. Systems and applications may connect to the policy server 130 via network 150 to make various policy related requests. In some embodiments, distribution mechanism 110 may request policy information associated with rights-protected content. In other embodiments, distribution mechanism 110 may request a change to a policy associated with rights-protected content. For example, distribution mechanism 110 may request a user be added to the policy's list of authorized users. In another embodiment, distribution mechanism may request policy server 130 change the permissions associated with a user already authorized to access the rights-protected content.

Policy server 130 may be configured to authorize a policy administrator to update or revoke access and usage rights to rights-protected content. In one example, a document owner (e.g., a policy administrator for the content and associated with policy server 130) may authorize another user to update or revoke access and usage rights to a document on behalf of the original document owner.

In some embodiments, policy server 130 may capture detailed audit information, including which users have viewed, altered and printed information within the rights-protected content. For example, policy server 130 may record (e.g., in a database) which user created rights-protected content along with the date and time the content was created. Policy server 130 may also record information about the users who read and edit the rights-protected content with the associated dates and times the rights-protected content was accessed.

In some embodiments, the policy server 130 may keep version information related to rights-protected content. When the rights-protected content is edited, the policy server 130 may save the old and new versions and assign version information (e.g., version numbers) to the old and new versions of the rights-protected content. In some embodiments, when a recipient 140 attempts to read an older version of rights-protected content, the policy server 130 may notify the recipient 140 that a newer version of the rights-protected content exists and give the recipient 140 the opportunity to view the newer version.

In some embodiments, when a recipient 140 attempts to access rights-protected content, the policy server 130 may verify user credentials against an authentication system (e.g., LDAP) in order to determine if the user is authorized to access the rights-protected content.

In order to increase security, in some embodiments rights-protected content may be encrypted. The process of encryption transforms legible content into an incomprehensible form. Decrypting the content transforms the content back to the original form. The policy server and the policy associated with the rights-protected content may determine which users are authorized to encrypt and/or decrypt content. Content recipients 140 may be configured to encrypt and decrypt rights-protected content when users associated with content receiver 140 have been authorized, authenticated and have the correct permissions. In some embodiments content recipients 140 and/or distribution mechanism 110 may make these determinations by communicating with and/or querying policy server 130 in order to receive policy information or a license to access the rights-protected content.

Types of encryption algorithms that may be used to encrypt and/or decrypt rights-protected content include symmetric and asymmetric. Symmetric key cryptography uses the same key for both encryption and decryption and is very fast and difficult to break with large keys. However, because both parties need the same key for effective communication to occur, key distribution becomes an issue. Common symmetric key encryption algorithms are AES, DES, 3DES and RC4. Asymmetric key cryptography, also called public key cryptography, uses key pairs for encryption and decryption. For instance, if the first key encrypts the content, then the second key of the pair decrypts the content. Similarly, if the second key is used to encrypt the information, then the first key must be used to decrypt the content. Typically, one key in the pair is labeled as the public key and the other is the private key. An individual keeps the private key secret, while the public key is freely distributed to others who wish to communicate with the individual. When someone wishes to send the individual a confidential message, he or she can encrypt it with the freely available public key and send the encrypted content to the individual. Because the individual is the only one who has the private key, he or she is the only one who can decrypt the content. Some common asymmetric algorithms are RSA, DSA and El Gamal.

When organizations distribute rights-protected content electronically, it is often important that recipients 140 are capable of verifying that the rights-protected content has not been altered (e.g., integrity), that the content is coming from the actual person who sent it (e.g., authenticity), and/or that the individual who signed the content cannot deny the signature (e.g., non-repudiation). In some embodiments, digital signatures (e.g., applied during the encryption process) may be associated with rights-protected content. Digital signatures enable recipients 140 to verify the integrity, authenticity and non-repudiation of the rights-protected content.

In some embodiments, policy server 130 may control rights-protected content after the content has been published. Policy server 130 may maintain expiration dates for the purpose of revoking access to rights-protected content. For example, a content author may configure a policy associated with rights-protected content so that access rights will expire in two weeks so that recipients 140 will not be able to access the rights-protected content once the expiration date has passed.

In some embodiments, policy server 130 may issue a license to users authorized to access the rights-protected content. A license may be a digital file that must available to users in order to access the rights-protected content. In some embodiments, the license may be a key used on content recipients 140 to decrypt the rights-protected document. For example, in the case where the rights-protected content is a document, recipient 140 may be implemented as a document viewer configured to decrypt and display the document using the license as the decryption key.

Content recipients 140 may be any system and/or application that can send and/or receive rights-protected content from distribution mechanism 110. For example, in some embodiments content recipient 140 may be implemented as an e-mail client and configured to communicate over network 150 utilizing Simple Mail Transport Protocol (SMTP) and/or POP3. Content recipient 140 may be configured to communicate with policy server 130 to determine permissions for creating, viewing, deleting and editing rights-protected content. In various embodiments, content recipient 140 may contain or be implemented as a reading or editing application (e.g., a word processing application, spreadsheet application, document authoring application, etc.) used for viewing and editing rights-protected content. According to one embodiment, a reading application may download policy information associated with rights-protected content from a policy server to determine if an action sought by an authenticated user is allowed.

Network 150 may be configured to allow data to be exchanged between distribution mechanism 110 and other computing systems attached to network 150, such as recipients 140 and policy server 130. Network 150 may correspond to various methods of communication between entities and may include, but is not limited to communication via local area and/or wide are networks, the Internet, telephone, fax, e-mail, real-time messages (e.g., instant messages), text messages, voice messages, and electronic content (e.g., e-mail attachments or file transfers). In general, network 150 may include any method that two entities may utilize to communicate with each other. While network 150 may be illustrated in a generalized manner, one of ordinary skill in the art will recognize that network 150 is meant to be representative of a complete communication path between distribution mechanism 110, policy server 130 and recipient 140 in accordance with the specific type of communication channel. For example, network 150 may include an e-mail communication channel including various intermediate destinations and/or systems such as e-mail clients, e-mail servers, and/or communication networks (e.g., the Internet). In another example, a communications channel may include one or more telecommunications networks as well as various network devices including circuits, switches, routers and/or gateways. In other embodiments, network 150 may allow data to be exchanged between nodes. In various embodiments, network 150 may support communication via wired or wireless general data networks, such as any suitable type of network, such as the public Internet and/or an Ethernet LAN; via telecommunications/telephony networks such as analog voice networks or digital fiber communications networks; via storage area networks such as Fibre Channel SANs, or via any other suitable type of network and/or protocol.

In one example, of how distribution mechanism 110 might function, a user may publish a rights-protected word processing document (e.g., rights-protected content) and assign a policy to the document granting recipient 140A read-only permission to the document. Subsequent to publishing the document, the publishing user may e-mail the document to recipient 140A. In this example, distribution mechanism 110 may be implemented as an e-mail client. Distribution mechanism 110 may receive the rights-protected document, and determine that recipient 140A is included in the policy (e.g., distribution mechanism may retrieve the policy information by communicating with policy server 130 to determine recipient 140A has read-only permission to view the document). Distribution mechanism 110 may then send the document to recipient 140A. In this example, recipient 140A may read the document and determine that recipient 140B should also be permitted to read the document. Recipient 140A may then e-mail the document to recipient 140B. Distribution mechanism 110 (e.g., implemented as an e-mail client) may receive the rights-protected document and determine recipient 140B does not have permission to view the rights-protected document. In this case, distribution mechanism 110 may hold the document (e.g., place the document on a hold queue) and send a message to policy server 130 requesting access rights be granted to recipient 140B. In one embodiment, the policy server may send an email to the original user (e.g., the document author) and the original user may respond to the email, granting or denying access rights for user 140B. In another embodiment, the original user may log into a web site and view one or more access rights requests and grant or deny requests by interacting with a web interface. After the original user approves the request, policy server 130 may add user 140B to the document policy and send an approval acknowledgement to distribution mechanism 110. Subsequent to receiving the acknowledgement, distribution mechanism 110 may remove the document from the hold queue and send the document to recipient 140B. In the case where the original user denies the request, distribution mechanism 110 may send a denial notification message to recipient 140A and the document will not be sent to recipient 140B.

In one embodiment, a document publisher may create a policy with no users included in the policy and associate the policy with a document. The document publisher may send the document (e.g., email) to one or more recipients. In one case, the distribution mechanism may place the document on hold and request the recipients be added to the policy (e.g., by communicating with the policy server or communicating with the document publisher). Subsequent to receiving approval (e.g., the recipients are added to the policy) the distribution mechanism may remove the hold and forward the document to the approved recipients.

Figure 2:
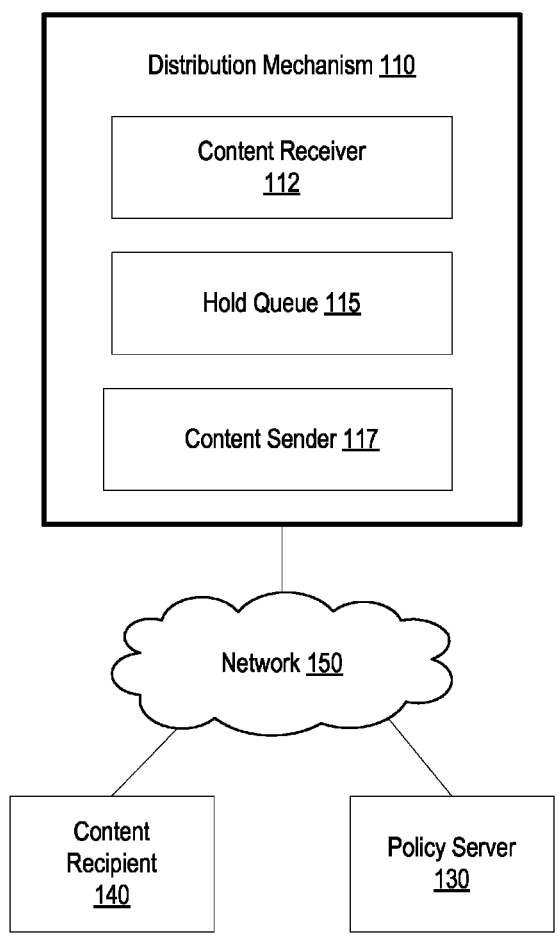
FIG. 2 is a block diagram illustrating a content distribution mechanism, according to an embodiment.

FIG. 2 is a block diagram illustrating a content distribution mechanism 110, according to an embodiment. In various embodiments distribution mechanism 110 may be implemented, for example, as an electronic mail (e-mail) client, e-mail server, e-mail plug-in, stand-alone application, a web browser applet, web server servlet, windows service or a component within a web browser, application program or application server. In some embodiments, distribution mechanism 110 may be implemented in a programming language such as C or C++ and compiled into an executable code module. In some embodiments, distribution mechanism 110 may be implemented in an object oriented programming language such as Java or C#. Distribution mechanism 110 may be compiled into bytecode, which may be executed in a runtime environment (e.g., Java Virtual Machine). Distribution mechanism 110 may be configured to execute within an operating system, such as Windows, Apple Macintosh OS, Linux, Unix or another operating system environment. In some embodiments, distribution mechanism 110 may be implemented in, or utilize web-based technologies such as Hypertext Markup Language (HTML), Javascript, Active Server Pages (ASP), *NET, J2EE, eXtensible Markup Language (XML), Simple Object Access Protocol (SOAP). Distribution mechanism 110 may be integrated within other applications.

In some embodiments, content receiver 112 may receive rights-protected content sent by a user for the purpose of forwarding the rights-protected content to one or more receivers 140. The list of intended recipients (e.g., content recipients 140) may be included in the rights-protected content (e.g., within an e-mail message). Distribution mechanism 110 may retrieve a policy associated with the rights-protected content. In some embodiments, distribution mechanism 110 may send a message to the policy server in order to retrieve the policy information associated with the rights-protected content. With the policy information, distribution mechanism 110 may determine which of the intended recipients 140 have permission to view the rights-protected content. Distribution mechanism 110 may compare the list of authorized users in the policy to the list of intended recipients 140. If any recipients have permission to access the rights-protected content, content sender 117 may send the rights-protected content to the recipients 140. If one or more recipients 140 do not have permission to access the rights-protected content (e.g., one or more users are in the recipient list, but are not included in the policy) distribution mechanism 110 may put the rights-protected content on hold (e.g., hold queue 115). In the case where some intended recipients are included in the policy and others are not, content sender 117 may forward the rights-protected content to those recipients 140 that are included in the policy and hold the rights-protected content on hold queue 115 until acknowledgement arrives for the recipients 140 that are not currently included in the policy as authorized users. When acknowledgement arrives from policy server 130, content sender 117 may remove the rights-protected content from hold queue 115 and send the rights-protected content to recipients 140.

In some embodiments, distribution mechanism 110 may determine that a recipient 140 is included in the list of authorized users within the policy as having access to the rights-protected content, but the recipient 140 does not currently have the desired usage rights to the rights protected content. In this case, distribution mechanism 110 may be configured to request the desired usage rights for the recipient 140. When distribution mechanism 110 receives an acknowledgement that the recipient 140 has been granted the desired usage rights to the rights-protected content, distribution mechanism 110 may forward the rights-protected content to the recipient 140.

Figure 3:
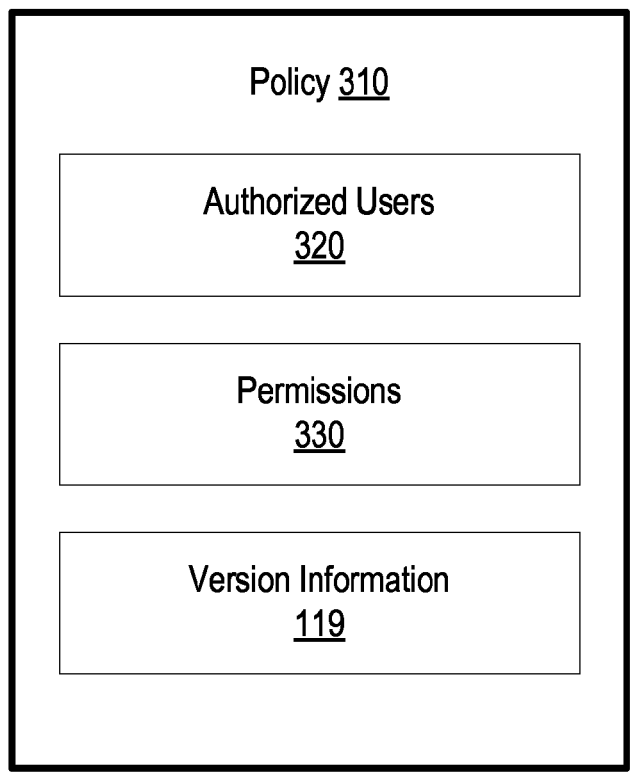
FIG. 3 is a block diagram illustrating a content policy, according to an embodiment.

FIG. 3 is a block diagram illustrating a content policy, according to an embodiment. The purpose of a policy 310 is to protect electronic content by assigning security parameters to the content and make the security parameters (e.g., policy) an integral part of the content itself, for example in some embodiments storing the policy within the content itself, or in other embodiments, storing the policy on a policy server 130, accessible by applications and systems connected to network 150. The policy 310 may ensure confidentiality. Policy 310 may define who (e.g., authorized users 320) has access to the document. The policy 310 may define permissions 330 associated with each authorized user. Permissions, or usage rights, govern a user's actions while working with rights-protected content. Permissions may specify whether or not a recipient who has access to the rights-protected content is allowed to read, print, change, copy the content, fill in fields, add comments, annotate the content, insert or remove pages, forward the content, access the content offline, digitally sign the content and so forth. Policy 310 may also contain version information 319. Version information 319 may include a unique identifier assigned to each version of the document. In some embodiments, when the document author changes the document, the version information increments. In some embodiments, permission information 330 and the list of authorized users 320 may change with version information. An author of rights-protected content may change the content's usage policies and prevent obsolete versions of the content from being accessed. Other parameters and attributes not shown in FIG. 3 may be included in a policy.

Figure 4:
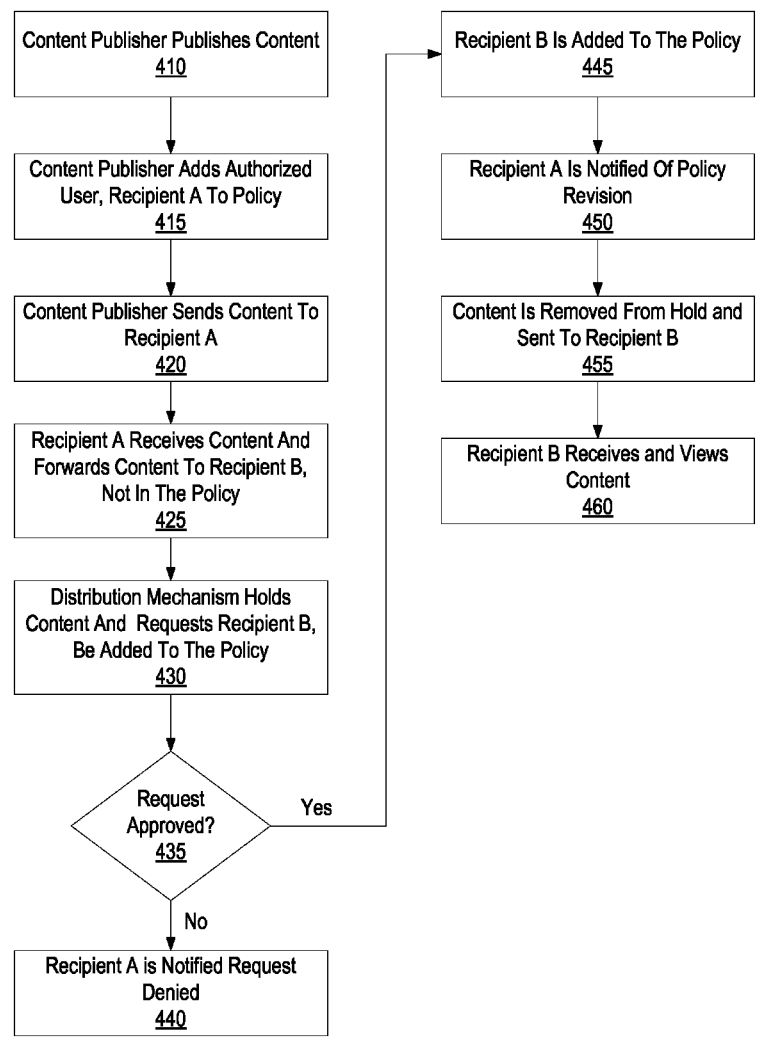
FIG. 4 is a flow diagram illustrating the publishing and sending of rights-protected content to one or more recipients, according to an embodiment.

FIG. 4 is a flow diagram illustrating an example of publishing and sending rights-protected content to one or more recipients, according to an embodiment. As shown in block 410, a content publisher may publish new content. In various embodiments, the content may be a word processing document, a spreadsheet document, a presentation document, a media file or any other suitable digital content accessible by a computer system.

As shown in block 415, the content publisher may add one or more authorized users to a policy 310 associated with the content. In one embodiment, the content publisher may add users to policy 310 by accessing a web page. The content publisher may create a policy (or use a policy template) and add one or more users to the policy. In another embodiment, the content publisher may email the content to one or more recipients and the act of emailing may automatically add the email recipients to the document policy. For example, the email client may recognize that the user sending the email is the content publisher (or another user having rights to add and remove users from a policy) associated with the content. When the email is sent, the email client may communicate with the policy server and automatically add the email recipients to the policy. In this example, the content publisher may add recipient 140A to policy 310. The content publisher may also associate permissions 330 with the authorized user, and in this example, content publisher may add "read-only" permission to the content policy 310 and associate the policy 310 with recipient 140A.

As shown in block 420, the content publisher may send the rights-protected content to a recipient 140A. In this example, distribution mechanism 110 may receive the rights-protected content, obtain the policy 310 associated with the rights-protected content and determine the recipient 140A has read-only permission to access the rights-protected content. In this case, distribution mechanism 110 may forward the rights-protected content to recipient 140A.

Recipient 140A may receive the rights-protected content as shown in block 425 and forward the rights-protected content to recipient 140B, who is not included as an authorized user within the policy 310 associated with the rights-protected content. Distribution mechanism 110 may receive the rights-protected content and obtain the policy associated with the rights-protected content and distribution mechanism may determine recipient 140B is not included in the policy 130 associated with the rights-protected content. In this example, distribution mechanism 110 may hold the rights-protected content (e.g., not send the content) and send a message to policy server 130 requesting recipient 140B be added to the policy as shown in block 430. In some embodiments, policy server 130 may contact a policy administrator requesting approval.

In some embodiments, a timeout value may be associated with the request for approval and the timeout value may be configured to timeout if a response is not received within a timeframe, wherein the timeframe may be determined by a configurable threshold not to be exceeded. If the timeout expires, the request may be considered to be denied.

As shown in block 435, distribution mechanism 110 may receive an acknowledgement indicating whether the request has been approved or denied. If the request is denied, in this example (as shown in block 440) recipient 140A is notified as such (e.g., an error message may be returned indicating the content has not been forwarded to recipient 140B). If the request is approved, recipient 140B is added to the policy as shown in block 445. Recipient 140B is then notified of the policy revision as shown in block 450. The hold is removed from the rights-protected content and the rights-protected content is sent to recipient 140B as shown in block 455. Recipient 140B may receive and view the rights-protected content as shown in block 460.

Figure 5:
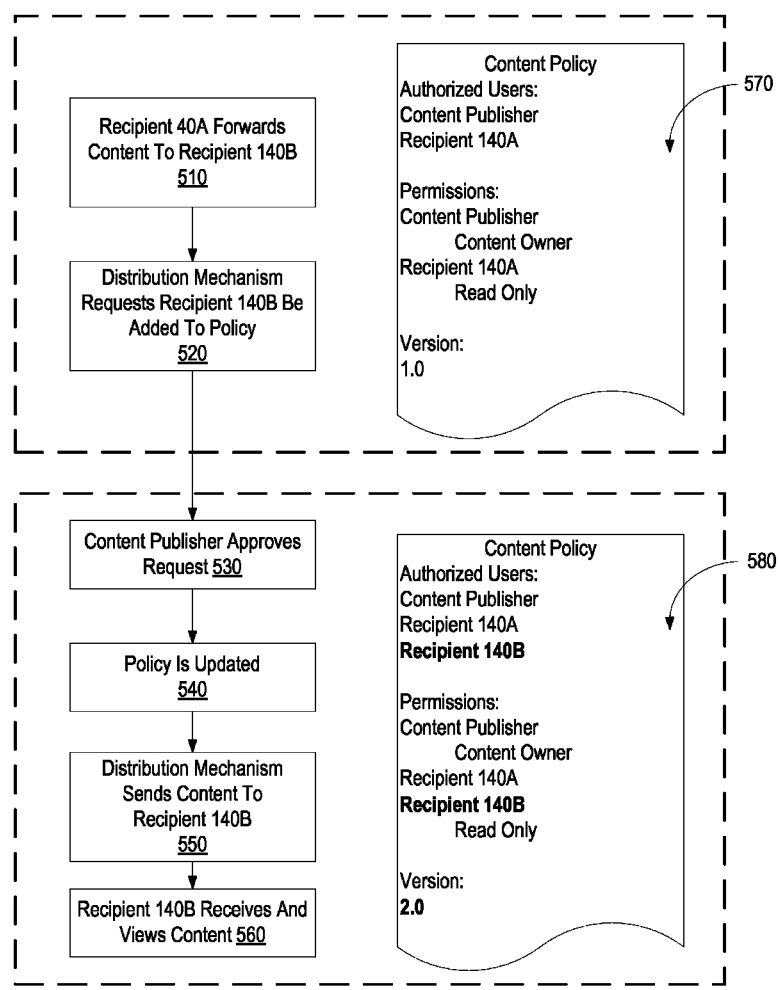
FIG. 5 is a flow diagram illustrating the forwarding of rights-protected content to a recipient and the associated changes to a policy, according to an embodiment.

FIG. 5 is a flow diagram illustrating the forwarding of rights-protected content to a recipient and the associated changes to a policy 310, according to an embodiment. Content policy 115 (See item 570) represents a policy associated with rights-protected content. In this example, the version number of the policy is 1.0 and the authorized users are the content publisher and content recipient 140A. In this example, the content publisher has "Content Owner" permissions, indicating the content publisher has all rights and privileges for the rights-protected content. Recipient 140A has "Read-Only" permissions. In this example, Recipient 140A has a copy of the rights-protected content and forwards the rights-protected content to recipient 140B using distribution mechanism 110 as shown in block 510. Distribution mechanism 110 receives the rights-protected content and requests recipient 140B be added to the policy (Item 570). In this example, since recipient 140B is not currently included in the policy (Item 570), distribution mechanism 110 may hold the rights-protected content and send a message requesting access rights to the rights-protected content for recipient 140B. In this example, the request is sent to policy server 130 and the content publisher approves the request as shown in block 530. The policy is then updated, as shown in block 540. Note that the policy (Item 580) now includes recipient 140B in the list of authorized users and recipient 140B has "Read-Only" permission associated with the rights-protected content. In this example, distribution mechanism 110 receives acknowledgement that recipient 140B has been authorized "Read-Only" access to the rights-protected content and distribution mechanism 110 sends the rights-protected content to recipient 140B as shown in block 550. Recipient 140B may then receive and view the rights-protected content as shown in block 560.

Figure 6:
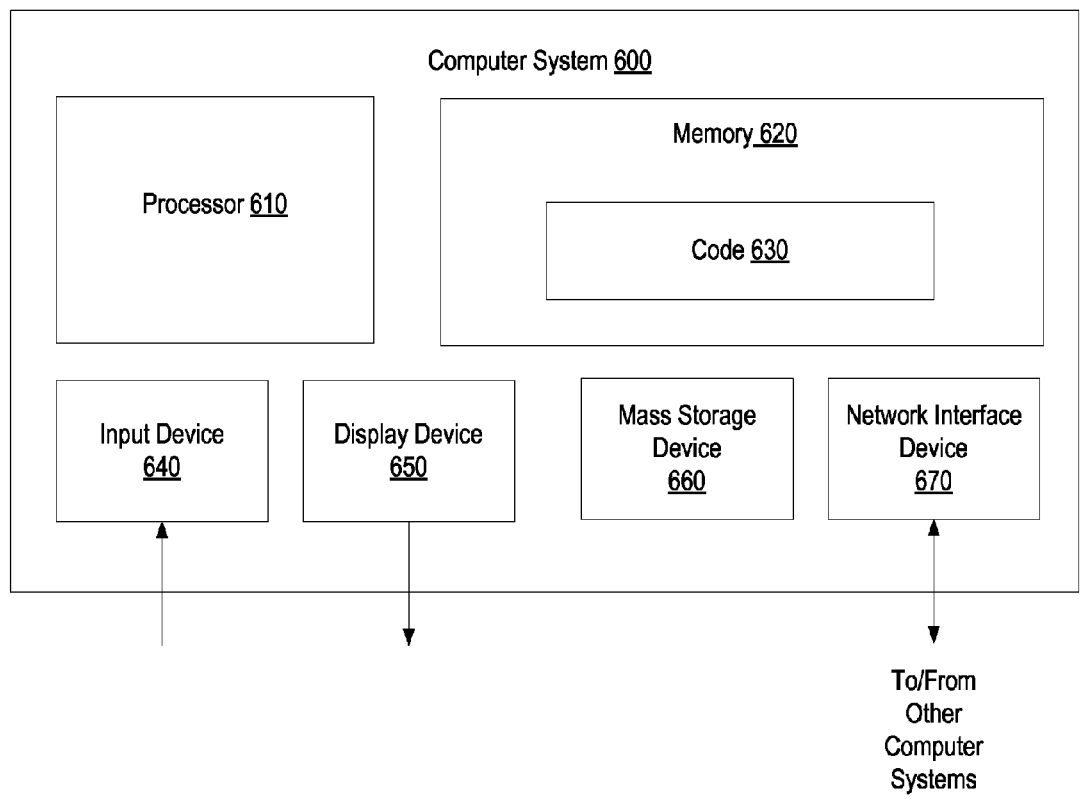
FIG. 6 is a block diagram illustrating the implementation of the system for distributing rights-protected content, according to an embodiment.

FIG. 6 is a block diagram illustrating the implementation of the system for distributing rights-protected content, according to an embodiment. Various components of embodiments of the distribution mechanism 110, policy server 130 and recipients 140 as described herein, may be executed on one or more computer systems, which may interact with various other devices. One such computer system is illustrated by FIG. 6. In the illustrated embodiment, computer system 600 includes one or more processors 610 coupled to a system memory 620. Computer system 600 further includes a network interface 670 and one or more input/output devices 640/650, such as a cursor control device, keyboard, audio device and display device 650. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a single processor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 610 may commonly, but not necessarily, implement the same ISA.

System memory 620 may be configured to store program instructions 630 (e.g., executable to implement a distribution mechanism as described herein) and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for the distribution mechanism 110, are shown stored within system memory 620 as program instructions 630 and data storage 660, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 600, or any suitable memory technology for storing program instructions, such as static random access memory (SRAM), synchronous dynamic RAM (SDRAM), nonvolatile/Flash-type memory, or any other type of memory. Program instructions and data stored via a computer-accessible medium may be transmitted by transmission media or signals such as electrical, electromagnetic, or digital signals, which may be provided via a communication medium such as a network and/or a wireless link, such as may be implemented via network interface 670.

Network interface 670 may be configured to allow data to be exchanged between computer system 600 and other devices attached to a network, such as other computer systems, or between nodes of computer system 600. In various embodiments, network interface 670 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 640 and 650 respectively, may in some embodiments include one or more display terminals, keyboards, keypads, touchpads, scanning devices, voice or optical recognition devices, or any other devices suitable for entering or retrieving data by one or more computer system 600. Multiple input/output devices 640 and 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 670.

Memory 620 may include program instructions 630, configured to implement at least a portion of embodiments of the distribution mechanism 110 as described herein, and data storage 660, comprising various documents, tables, databases, etc. accessible by program instructions 630. In one embodiment, program instructions 630 may include software elements of the distribution mechanism 110 illustrated in the Figures, and data storage 660 may include data used in embodiments of the distribution mechanism 110. In other embodiments, different software elements and data may be included. Program instructions and/or data may be stored, for example, on various types of memory including hard disks.

Those skilled in the art will appreciate that computer system 600 is merely illustrative and is not intended to limit the scope of the distribution mechanism 110 as described herein. In particular, the computer system and devices may include any combination of hardware or software that can perform the indicated functions, including computers, network devices, internet appliances, PDAs, mobile phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
 receiving, by a distribution mechanism, rights-protected content for a recipient who has access rights to the rights-protected content;
 receiving a request, from the recipient, to forward the received rights-protected content through the distribution mechanism to another recipient, wherein access rights for the rights-protected content are controlled according to a policy via a policy server;
 determining, based on the policy, if the another recipient currently has access rights to the rights-protected content;
 in response to determining that the another recipient does not currently have access rights to the rights-protected content, the distribution mechanism:
  holding the content in a hold queue; and sending a communication to an entity authorized to grant access rights for the rights-protected content, the communication including a request to update the policy by granting access rights to the rights-protected content to the another recipient; and upon receiving acknowledgement that the another recipient has been granted access rights to the rights-protected content in response to the communication, the distribution mechanism:

releasing the rights-protected content from the hold queue; and forwarding the rights-protected content to the another recipient in accordance with the policy.

2. The computer-implemented method as recited in claim 1, wherein the entity authorized to grant access rights is the policy server.

3. The computer-implemented method as recited in claim 1, wherein the entity authorized to grant access rights is a user having authority to grant access rights via the policy server to said recipient.

4. The computer-implemented method as recited in claim 1, wherein the distribution mechanism comprises electronic mail (e-mail) mechanism, and wherein said holding the content in the hold queue and said requesting access rights are performed by an e-mail client application.

5. The computer-implemented method as recited in claim 1, wherein the distribution mechanism comprises an electronic mail (e-mail) mechanism, and wherein said holding the content in the hold queue and said requesting access rights are performed by an email server.

6. The computer-implemented method as recited in claim 1, further comprising:

in response to said receiving the request to forward:

the distribution mechanism contacting the policy server to determine whether the recipient has access rights to the rights-protected content;

wherein said requesting access rights is performed in response to determining that the recipient does not currently have access rights to the rights-protected content.

7. The computer-implemented method as recited in claim 1, wherein said receiving the request to forward the rights-protected content comprises receiving a request to forward the rights-protected content via the distribution mechanism to a plurality of recipients, the method further comprising the distribution mechanism holding the rights-protected content in the hold queue and requesting access rights to the rights-protected content for each recipient not currently having access rights to the rights-protected content.

8. The computer-implemented method as recited in claim 7, further comprising the distribution mechanism forwarding the rights-protected content to each recipient that already has access rights to the rights-protected content without holding the rights-protected content in the hold queue.

9. The computer-implemented method as recited in claim 1, further comprising:

receiving a request to forward the rights-protected content through the distribution mechanism to a recipient who has access rights but does not currently have desired usage rights to the rights-protected content, wherein said request to forward comprises the desired usage rights;

in response to said receiving the request to forward, the distribution mechanism holding the content in the hold queue and requesting the desired usage rights to the rights-protected content for the recipient; and upon receiving acknowledgement that the recipient has been granted the desired usage rights to the rights-protected content, the distribution mechanism forwarding the rights-protected content to the recipient.

10. The computer-implemented method as recited in claim 1, further comprising:

receiving a request to forward the rights-protected content through the distribution mechanism to another recipient who does not currently have access rights to the rights-protected content;

in response to said receiving the request to forward, the distribution mechanism holding the content in the hold queue and requesting access rights to the rights-protected content for the another recipient; and in response to determining that the another recipient has not been granted access rights to the rights-protected content, the distribution mechanism returning an error message indicating that the rights-protected content has not been forwarded to the another recipient and the another recipient has not been granted access rights to the rights-protected content.

11. A computer system, comprising:

one or more processors; and a memory coupled to the one or more processors, wherein the memory stores program instruction executable by the one or more processors to implement a distribution mechanism configured to:

receive, by the distribution mechanism, rights-protected content for a recipient who has access rights to the rights-protected content;

receive a request, from the recipient, to forward the received rights-protected content to another recipient, wherein access rights for the rights-protected content are controlled according to a policy;

determine, based on the policy, by the distribution mechanism, that the another recipient does not currently have access rights to the rights-protected content;

in response to determining that the another recipient does not currently have access rights to the rights-protected content;

hold the rights-protected content in a hold queue; and send a communication to an entity authorized to grant access rights for the rights-protected content, the communication including a request to update the policy by granting access rights to the rights-protected content to the another recipient; and upon receiving acknowledgement that the another recipient has been granted access rights to the rights-protected content in response to the communication:

release the rights-protected content from the hold queue; and forward the rights-protected content to the another recipient in accordance with the policy.

12. A computer system, comprising:

a processor; and memory coupled to the processor and configured to store program instructions executable by the processor to implement a distribution mechanism configured to:

accept a request to distribute rights-protected content associated with a policy to one or more recipients, wherein the policy comprises access rights comprising a list of one or more authorized users, wherein only authorized users are permitted to access the rights-protected content;

determine if the one or more recipients are included in the policy as authorized users having access rights to the rights-protected content;

in response to determining, based on the policy, that one or more of the recipients do not have rights to the rights-protected content, the distribution mechanism is further configured to:
    hold the rights-protected content in a hold queue; and
    request that the one or more recipients not included in the policy be added to the policy associated with the rights-protected content, wherein to perform said requesting, the distribution mechanism is further configured to send a communication to an entity authorized to grant access rights for the rights-protected content, the communication including a request to update the policy by granting access rights to the rights-protected content to the one or more recipients; and
in response to receiving an approval message in response to the communication to the entity authorized to grant access rights, the distribution mechanism is further configured to:
    release the rights-protected content from the hold queue; and
    distribute the rights-protected content to the recipients added to the policy as authorized users having access rights to the rights-protected content in accordance with the policy.

13. The computer system as recited in claim 12, wherein the policy further comprises:
one or more permissions associated with each of the authorized users in the policy, wherein the permissions define actions each of the authorized users in the policy are permitted to perform on the rights-protected content; and
a policy version number.

14. The computer system as recited in claim 12, wherein the distribution mechanism is included within an electronic mail (e-mail) client.

15. The computer system as recited in claim 12, wherein the distribution mechanism is configured to:
hold the rights-protected content in the hold queue subsequent to accepting the request to distribute the content; and
in response to receiving the approval message, release the rights-protected content from the hold queue and forward the rights-protected content to the recipients.

16. The computer system as recited in claim 12, wherein the policy is maintained on a network-based policy server and the distribution mechanism is configured to:
send the request for the one or more recipients to be added to the policy to a policy server; and
receive the approval message from the policy server.

17. The computer system as recited in claim 12, wherein the distribution mechanism is further configured to:
send the request for the one or more recipients to be added to the policy to a policy administrator having authority to grant access rights via a policy server to said recipient.

18. The computer system as recited in claim 12, wherein the distribution mechanism is configured to timeout the request for the one or more recipients to be added to the policy if a response is not received within a set time frame.

19. The computer system as recited in claim 12, wherein the authorized users included in the policy having access rights to the rights-protected content, receive a license to access the content.

20. A non-transitory computer-accessible storage medium, comprising program instructions, wherein the program instructions are computer-executable to implement a distribution mechanism configured to:
receive, by the distribution mechanism, rights-protected content for a recipient who has access rights to the rights-protected content;
receive a request, from the recipient, to forward the received rights-protected content to another recipient, wherein access rights for the rights-protected content are controlled according to a policy via a policy server;
determine, based on the policy, if the another recipient currently has access rights to the rights-protected content;
in response to determining that the another recipient does not currently have access rights to the rights-protected content:
    hold the content in a hold queue; and
    send a communication to an entity authorized to grant access rights for the rights-protected content, the communication including a request to update the policy by granting access rights to the rights-protected content to the another recipient; and
upon receiving acknowledgement that the another recipient has been granted access rights to the rights-protected content in response to the communication, release the rights-protected content from the hold queue.

21. The computer-accessible storage medium as recited in claim 20, wherein the entity authorized to grant access rights is the policy server.

22. The computer-accessible storage medium as recited in claim 20, wherein the entity authorized to grant access rights is a user having authority to grant access rights via the policy server to said recipient.

23. The computer-accessible storage medium as recited in claim 20, wherein the distribution mechanism is an electronic mail (e-mail) client application.

24. The computer-accessible storage medium as recited in claim 20, wherein the distribution mechanism is further configured to:
in response to said request for access rights:
    contact the policy server to determine whether the recipient has access rights to the rights-protected content; and
    wherein the distribution mechanism is configured to request access rights in response to determining that the recipient does not currently have access rights to the rights-protected content.

25. The computer-accessible storage medium as recited in claim 20, wherein the distribution mechanism is further configured to:
forward the rights-protected content to a plurality of recipients; and
hold the rights-protected content in the hold queue and request access rights to the rights-protected content for each recipient not currently having access rights to the rights-protected content.

26. The computer-accessible storage medium as recited in claim 20, wherein the distribution mechanism is further configured to forward the rights-protected content to each recipient that already has access rights to the rights-protected content without holding the rights-protected content in the hold queue.

27. The computer-accessible storage medium as recited in claim 20, wherein the distribution mechanism is further configured to:
receive the request to forward the rights-protected content through the distribution mechanism to a recipient who has access rights but does not currently have desired usage rights to the rights-protected content, wherein said request to forward comprises the desired usage rights;

in response to said request to forward, hold the content in the hold queue and request the desired usage rights to the rights-protected content for the recipient; and upon receiving acknowledgement that the recipient has been granted the desired usage rights to the rights-protected content, forward the rights-protected content to the recipient.

28. The computer-accessible storage medium as recited in claim 20, wherein the distribution mechanism is further configured to:

receive a request to forward the rights-protected content to another recipient who does not currently have access rights to the rights-protected content;

in response to said request to forward, hold the content in the hold queue and send a request for access rights to the rights-protected content for the another recipient; and in response to determining that the another recipient has not been granted access rights to the rights-protected content, return an error message indicating that the rights-protected content has not been forwarded to the another recipient and the another recipient has not been granted access rights to the rights-protected content.

\* \* \* \* \*